(12) United States Patent
Shoji et al.

(10) Patent No.: US 9,099,105 B1
(45) Date of Patent: Aug. 4, 2015

(54) DISK-SHAPED INFORMATION RECORDING MEDIUM, DISK CARTRIDGE AND INFORMATION RECORDING AND REPRODUCING APPARATUS

(71) Applicant: Panasonic Intellectual Property Management Co., Ltd., Osaka (JP)

(72) Inventors: Mamoru Shoji, Osaka (JP); Yoshihiro Kawasaki, Okayama (JP); Shuji Tabuchi, Okayama (JP); Hidemi Isomura, Okayama (JP); Kazuya Hisada, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/602,976

(22) Filed: Jan. 22, 2015

(30) Foreign Application Priority Data

Jan. 24, 2014 (JP) ................. 2014-010895
Oct. 30, 2014 (JP) ................. 2014-221882

(51) Int. Cl.
| | |
|---|---|
| *G11B 23/00* | (2006.01) |
| *G11B 7/24097* | (2013.01) |
| *G11B 7/24094* | (2013.01) |
| *G11B 7/24047* | (2013.01) |
| *G11B 7/24* | (2013.01) |
| *G11B 7/26* | (2006.01) |
| *G11B 33/04* | (2006.01) |
| *G11B 7/24044* | (2013.01) |

(52) U.S. Cl.
CPC ............. *G11B 7/24097* (2013.01); *G11B 7/24* (2013.01); *G11B 7/24047* (2013.01); *G11B 7/24094* (2013.01); *G11B 7/26* (2013.01); *G11B 23/0035* (2013.01); *G11B 7/24044* (2013.01); *G11B 33/0438* (2013.01); *G11B 2007/240012* (2013.01)

(58) Field of Classification Search
CPC ............. G11B 27/105; G11B 23/0308; G11B 2220/2545; G11B 17/056; G11B 7/24; G11B 7/26; G11B 7/24097; G11B 7/24047; G11B 23/0035; G11B 33/0438; G11B 2007/240012; G11B 7/24044; G11B 23/035; G11B 17/0476; G11B 17/057; G11B 7/24
USPC ................. 369/30.27, 280; 720/725, 718, 719
See application file for complete search history.

(56) References Cited

U.S. PATENT DOCUMENTS

| | | | | |
|---|---|---|---|---|
| 6,272,093 | B1 * | 8/2001 | Kurozuka et al. ............. | 720/627 |
| 6,961,951 | B2 * | 11/2005 | Usami .......................... | 720/718 |
| 7,305,690 | B2 * | 12/2007 | Usami .......................... | 720/718 |
| 7,665,103 | B2 * | 2/2010 | Usami et al. ................. | 720/725 |
| 8,930,974 | B2 * | 1/2015 | Shoji et al. ................... | 720/718 |

FOREIGN PATENT DOCUMENTS

| | | |
|---|---|---|
| JP | 1-103022 U | 7/1989 |
| JP | 5-198015 A | 8/1993 |

\* cited by examiner

*Primary Examiner* — Ali Neyzari
(74) *Attorney, Agent, or Firm* — McDermott Will & Emery LLP

(57) ABSTRACT

An information recording medium of the present exemplified embodiment is configured by laminating a substrate having a predetermined thickness and a substrate having a predetermined thickness to each other. A film forming region including a recording region, a clamp region and a rib are formed on one surface of the information recording medium. A film forming region including a recording region, a clamp region and a rib are formed on the other surface of the information recording medium. On both surfaces, the components are formed in the order of the rib, the clamp region and the film forming region toward an outer peripheral side from an inner peripheral side.

10 Claims, 17 Drawing Sheets

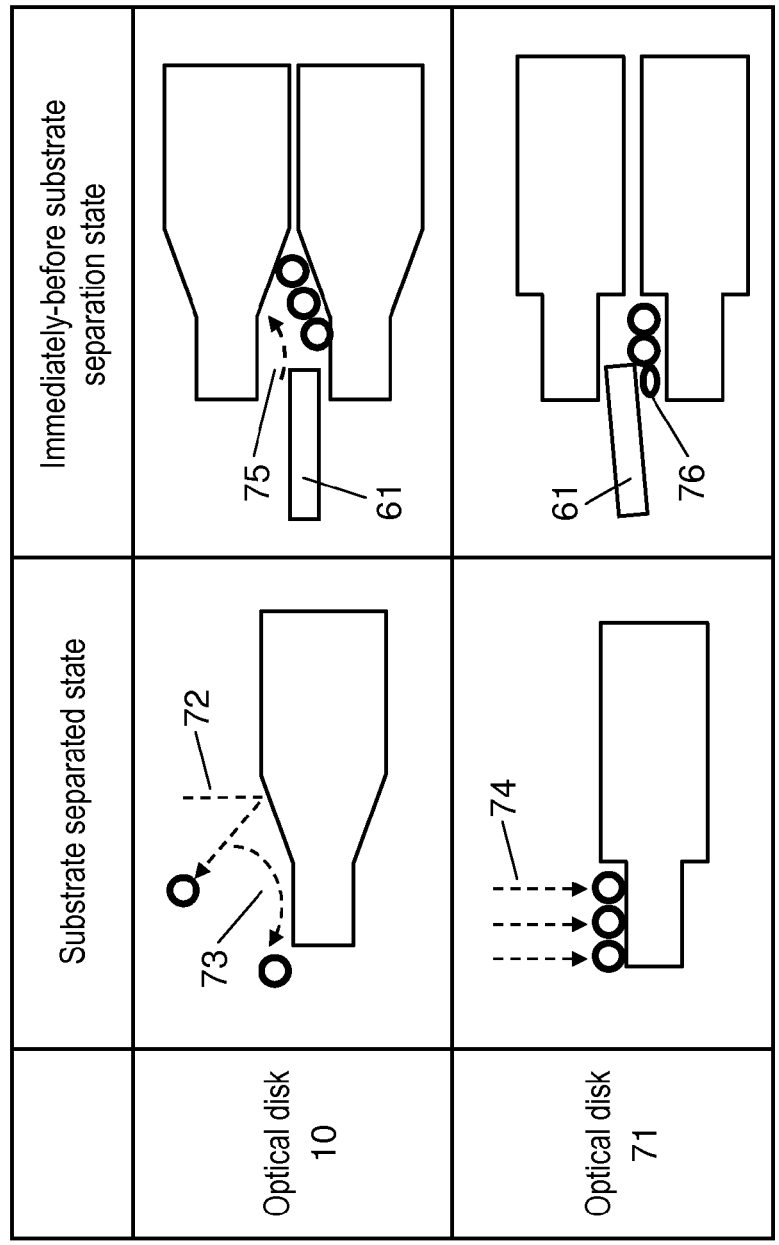

FIG. 8

|  | Basic state | Second disk inversed up-side-down |
|---|---|---|
| Optical disk 10 | 81<br>11a<br>14a<br>11b<br>14b | 82<br>11a<br>14a<br>14b<br>11b |
| Optical disk 81 | 83<br>81a<br>81b | 84<br>81a<br>81b |

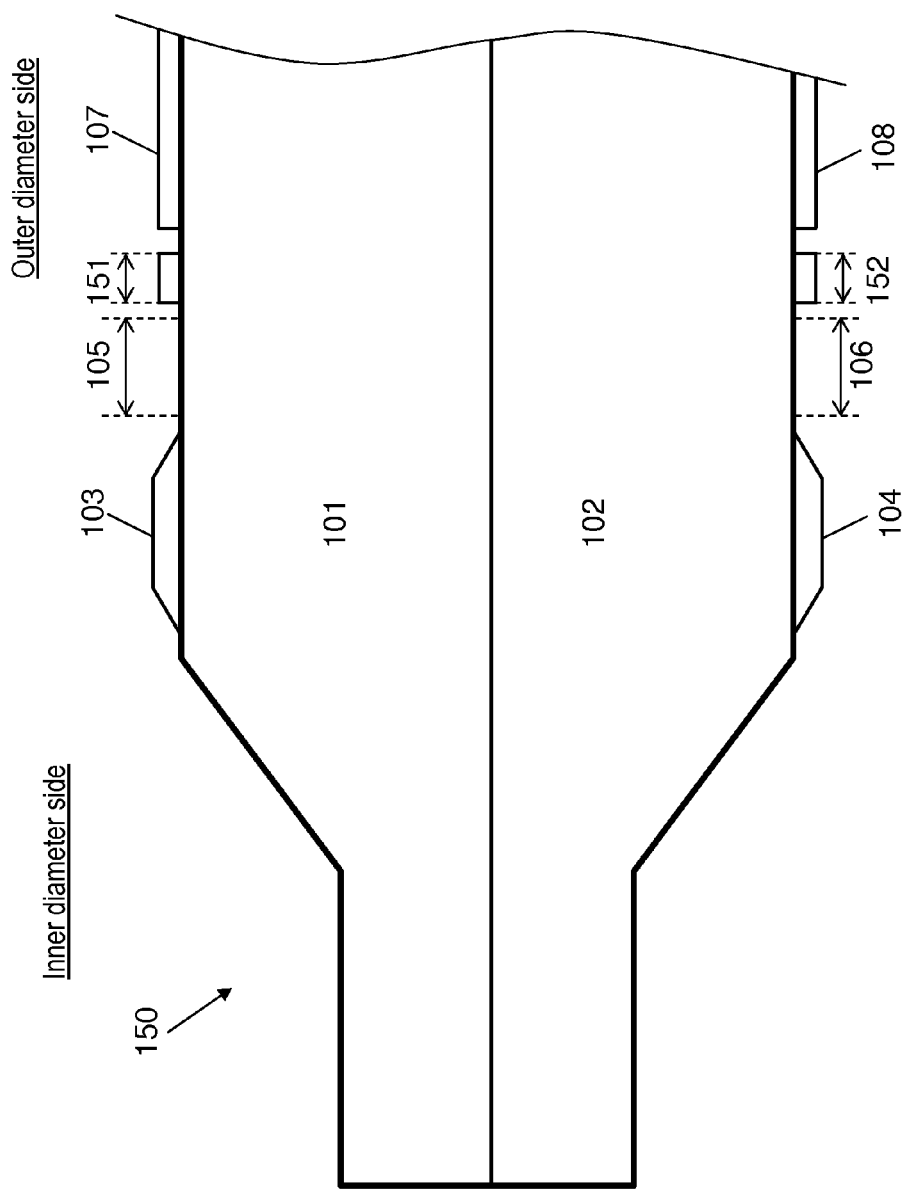

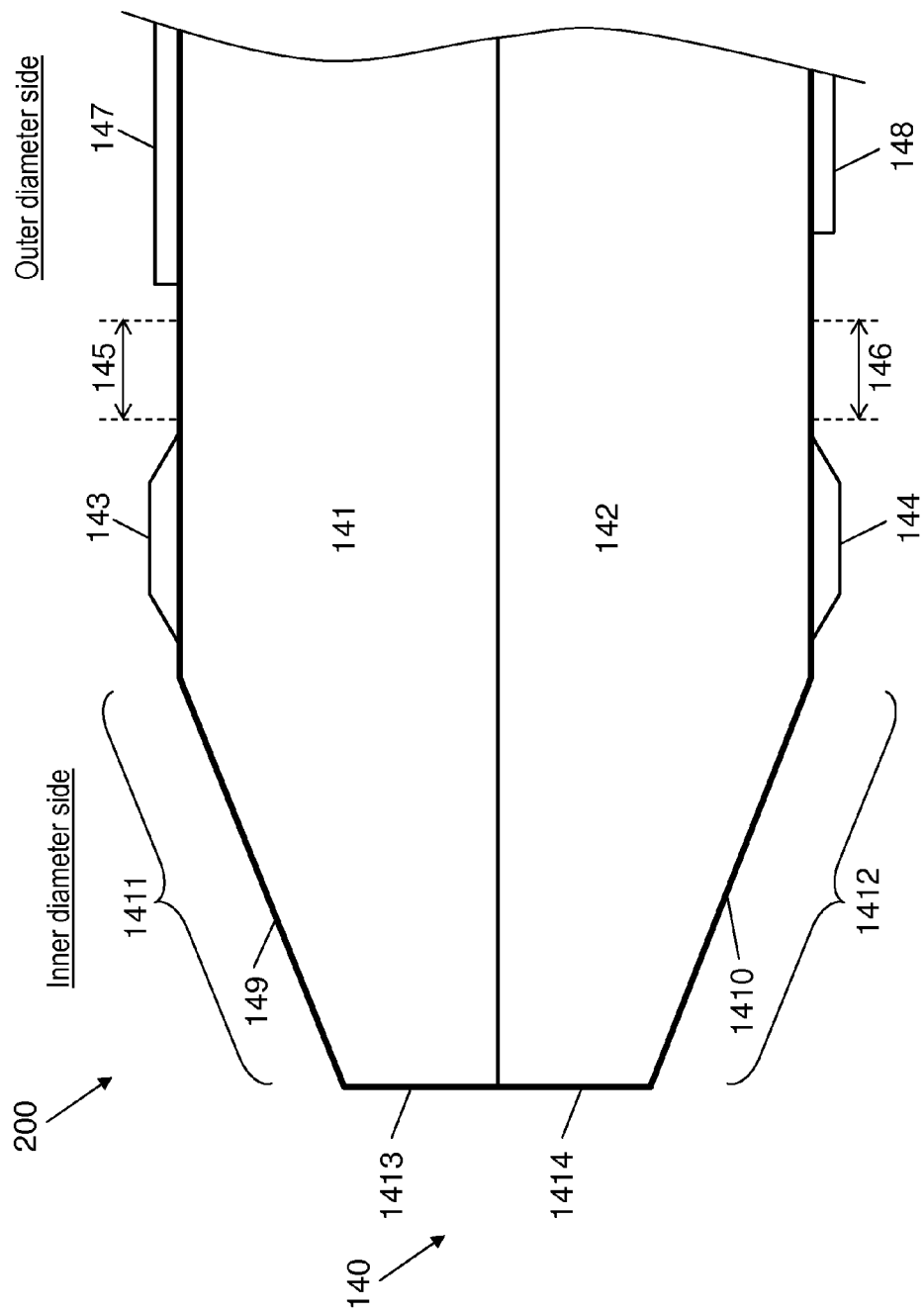

DISK-SHAPED INFORMATION RECORDING MEDIUM, DISK CARTRIDGE AND INFORMATION RECORDING AND REPRODUCING APPARATUS

RELATED APPLICATIONS

This application claims the benefit of Japanese Application No. 2014-010895, filed on Jan. 24, 2014 and Japanese Application No. 2014-221882, filed on Oct. 30, 2014, the disclosures of which Applications are incorporated by reference herein.

BACKGROUND

1. Field

This disclosure relates to a recording medium in which information is recorded, and more particularly to a disk-shaped recording medium, and a disk cartridge which stores a plurality of disk-shaped recording media in a stacked manner.

2. Description of the Related Art

An optical disk includes a substrate and a cylindrical portion mounted on a center portion of the substrate and having a through hole. As one example of the optical disk, for example, there has been disclosed an optical disk where a notched portion is formed on an outer diameter side of a cylindrical portion (refer to Unexamined Japanese Utility Model Publication No. 1-103022, for example). As another example of the optical disk, there has been disclosed an optical disk where a label printing region is formed on one surface of the optical disk (refer to Unexamined Japanese Patent Publication 5-198015).

SUMMARY

An information recording medium according to an exemplary embodiment of the present disclosure is a disk-shaped information recording medium, and includes: a substrate; a first surface; a second surface; a cylindrical portion; a first recording region; a second recording region; a first clamp region; a second clamp region; a first rib; a second rib; and a first printing region. The substrate has a predetermined thickness. The first surface is one surface of the substrate. The second surface is the other surface of the substrate. A through hole which penetrates the center of the substrate is formed in the cylindrical portion. The first recording region is formed on a first surface side. The second recording region is formed on a second surface side. The first clamp region is formed on a first surface side, and a clamper is brought into contact with the first clamp region when the first recording region is reproduced. The second clamp region is formed on a second surface side, and a clamper is brought into contact with the second clamp region when the second recording region is reproduced. The first rib is formed in a circular annular shape on the first surface side and on an inner peripheral side of the first clamp region. The second rib is formed in a circular annular shape on a second surface side and on an inner peripheral side of the second clamp region. The first printing region is formed between the first rib and the first recording region.

BRIEF DESCRIPTION OF DRAWINGS

FIG. 7 is an explanatory view showing a state where a foreign substance is mixed into a thin wall portion of a center cylindrical portion according to the first exemplary embodiment;

FIG. 8 is an explanatory view for explaining a case where non-symmetrical disks according to the first exemplary embodiment are stacked;

FIG. 14 is a cross-sectional view showing the structure of a center portion of an optical disk according to a modification of the third exemplary embodiment;

FIG. 16 is a cross-sectional view showing the structure of a center portion of an optical disk according to another exemplary embodiment;

DETAILED DESCRIPTION

Hereinafter, exemplary embodiments are described in detail by reference to drawings when appropriate. However, there may be cases where detailed descriptions more than necessary are omitted. For example, there may be cases where the detailed description of matters which are already well-known and the repeated description of the substantially same configuration are omitted. This enables the description made hereinafter from being unnecessarily redundant thus facilitating the understanding of the present disclosure by those who are skilled in the art.

The inventors of the present disclosure give the accompanying drawings and the following descriptions to allow those who are skilled in the art to sufficiently understand the present disclosure, and the subject defined in the claims is not intended to be restricted thereby.

First Exemplary Embodiment

First exemplary embodiment is described hereinafter with reference to FIG. 1 to FIG. 7.

[1-1. Constitution]
[1-1-1. Optical Disk]

Figure 1A:
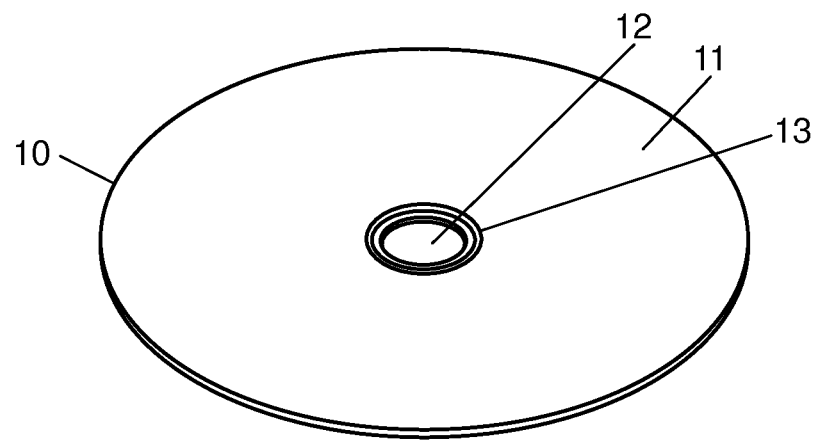
FIG. 1A is a perspective view of an optical disk according to a first exemplary embodiment as viewed from a front surface of the optical disk.
Figure 1B:
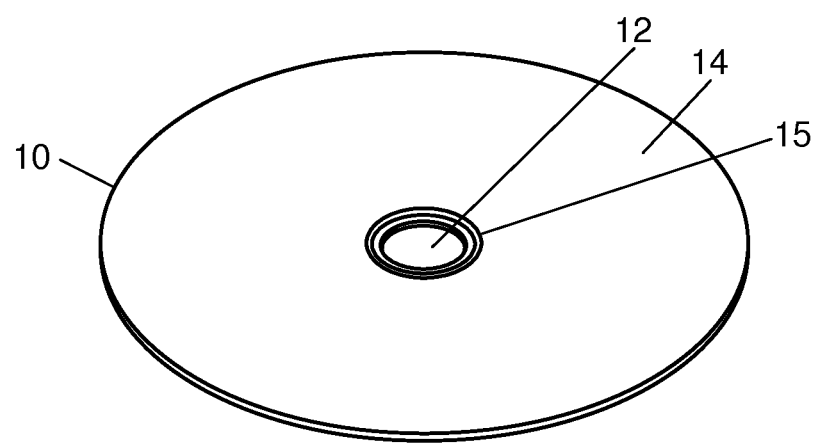
FIG. 1B is a perspective view of the optical disk according to the first exemplary embodiment as viewed from a back surface of the optical disk.
Figure 2:
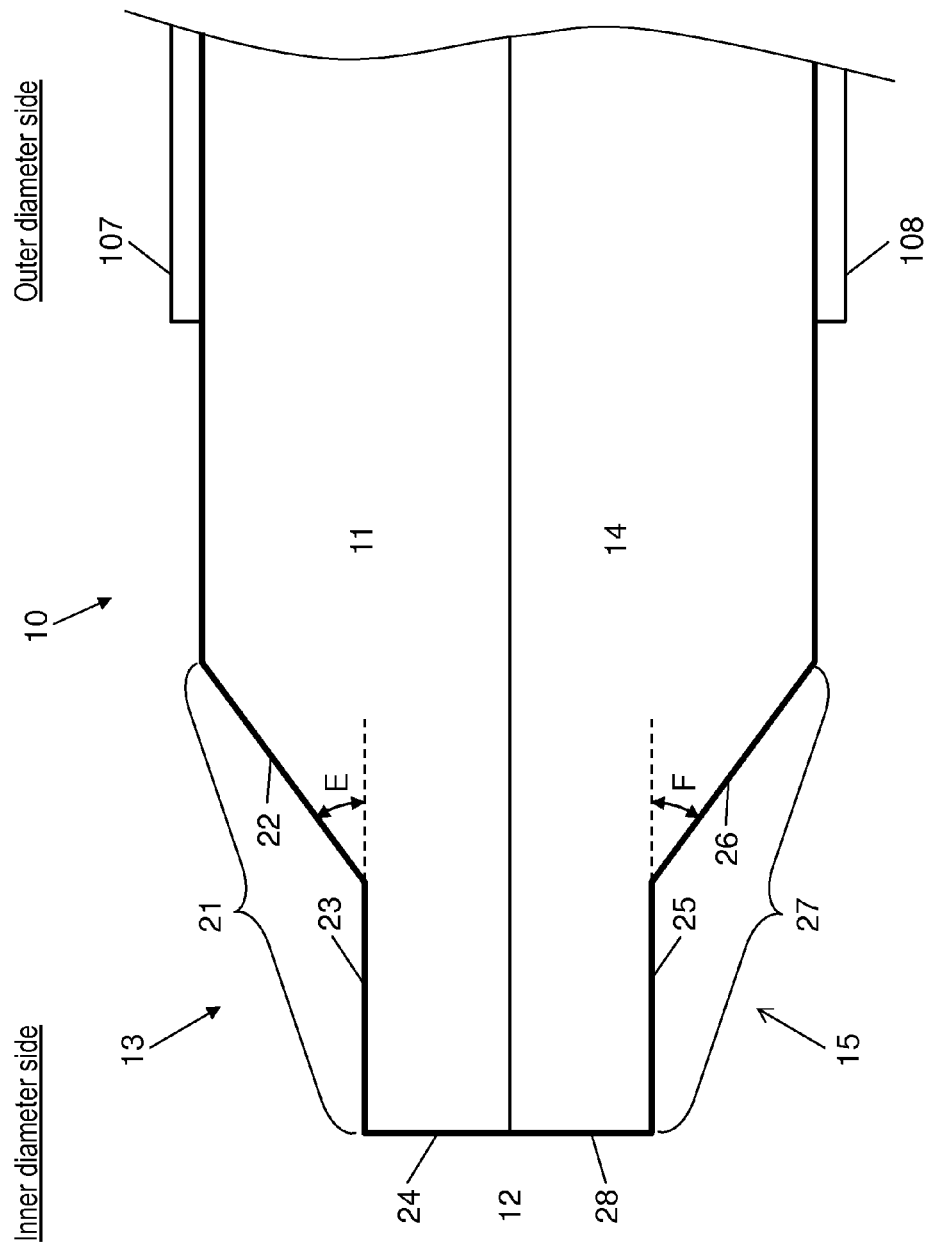
FIG. 2 is a cross-sectional view showing the structure of a center portion of the optical disk according to the first exemplary embodiment.

FIG. 1A is a perspective view of optical disk 10 (one example of a disk-shaped information recording medium) of the first exemplary embodiment as viewed from a front surface side. FIG. 1B is a perspective view of optical disk 10 (one example of the disk-shaped information recording medium) of the first exemplary embodiment as viewed from a back surface side. Here, the optical disk is, for example, a Blu-ray (registered trademark) Disc (BD), a DVD, a CVD or the like. Optical disk 10 is formed by laminating substrate 11 (one example of a substrate) having a predetermined thickness and substrate 14 (one example of a substrate) having a predetermined thickness to each other. Optical disk 10 also includes: center cylindrical portion 13 on a front surface side where through hole 12 (a portion of the cylindrical portion) is formed; and center cylindrical portion 15 on a back surface side where through hole 12 (a portion of the cylindrical portion) is formed. Substrate 11 (one example of the substrate, one example of the first surface) and substrate 14 (one example of the substrate, one example of the second surface) are formed by injection molding using a transparent resin such as polycarbonate. As shown in FIG. 2, on substrate 11 and substrate 14, a recording film for recording information, film forming region 107 (one example of first recording region) which includes a cover layer, and film forming region 108 (one example of second recording region) which includes a cover layer are formed respectively. Substrate 11 and substrate 14 are laminated to each other such that a surface of substrate 11 on which film forming region 107 is formed and a surface of film forming region 108 on which film forming region 108 is formed form outer sides respectively.

Optical disk 10 according to the present exemplary embodiment is formed by laminating substrate 11 and substrate 14 to each other and hence, warping of optical disk 10 can be reduced. When it is unnecessary to take into account warping of optical disk 10, optical disk 10 may be formed of a single plate. In forming optical disk 10 by laminating substrate 11 and substrate 14 to each other, for decreasing eccentricity, it is necessary to laminate substrate 11 and substrate 14 to each other with high accuracy such that the center through hole formed in substrate 11 and the center through hole formed in substrate 14 agree with each other. On the other hand, when optical disk 10 is formed of a single plate, the above-mentioned drawback does not arise and hence, optical disk 10 can be formed easily.

Figure 5:
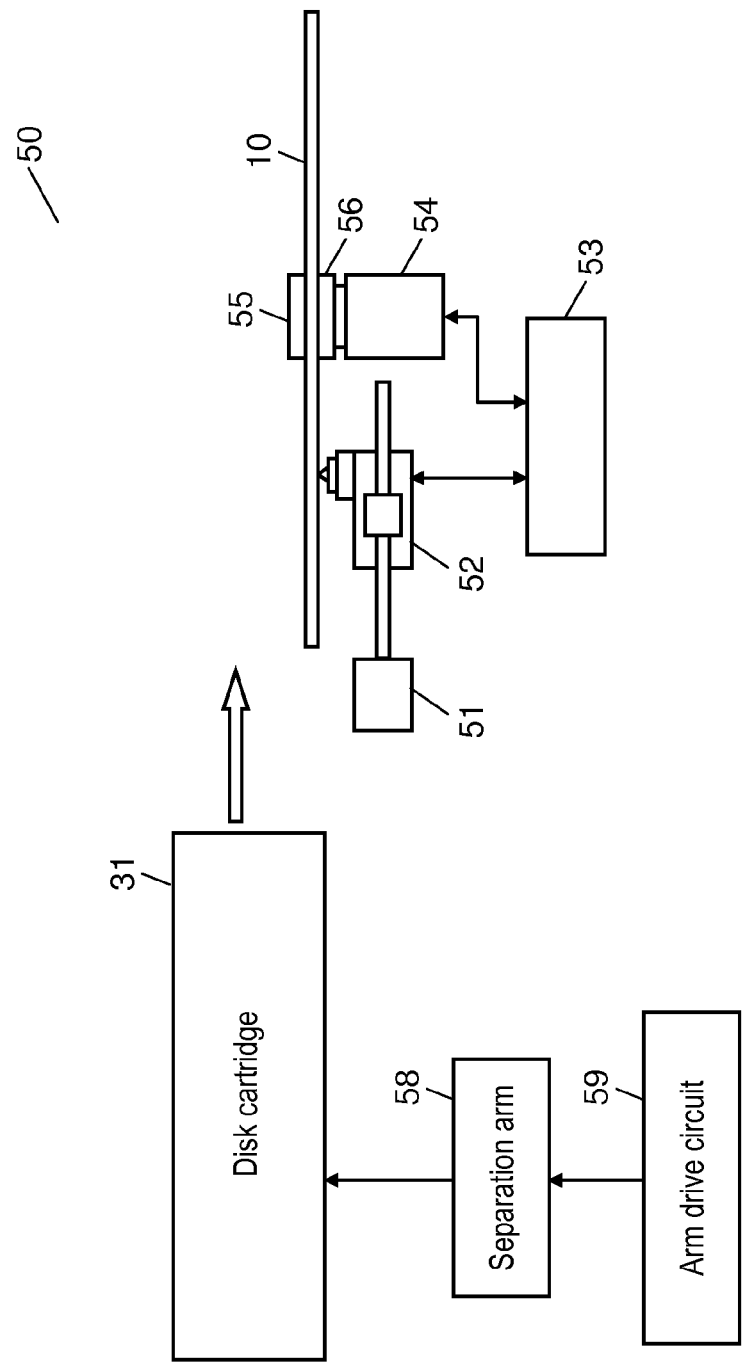
FIG. 5 is a schematic view of an information recording and reproducing apparatus for the optical disk.

Through hole 12 is formed in the vicinity of the center of substrate 11 and the center of substrate 14 for enabling mounting of optical disk 10 on turntable 56 described later (FIG. 5).

FIG. 2 is a cross-sectional view of substrate 11 and substrate 14 of optical disk 10 according to first exemplary embodiment. Thin wall portion 21 (one example of thin wall portion) having a smaller thickness than substrate 11 is formed on an outer-diameter side portion of center cylindrical portion 13 formed on a recording surface side of substrate 11. In the same manner, thin wall portion 27 (one example of thin wall portion) having a smaller thickness than substrate 14 is formed on an outer-diameter side portion of center cylindrical portion 15 formed on a recording surface side of substrate 14. Thin wall portion 21 has: a horizontal surface 23 (one example of non-inclined surface); inclined surface 22 (one example of inclined surface) formed continuously with horizontal surface 23; and vertical surface 24 formed continuously on an inner diameter side of horizontal surface 23. In the same manner, thin wall portion 27 has: a horizontal surface 25 (one example of non-inclined surface); inclined surface 26 (one example of inclined surface) formed continuously with horizontal surface 25; and vertical surface 28 formed continuously on an inner diameter side of horizontal surface 25.

Inclined surface 22 makes inclination angle E with respect to horizontal surface 23. In the same manner, inclined surface 26 makes inclination angle F with respect to horizontal surface 25. In the first exemplary embodiment, inclination angle E and inclination angle F are substantially equal to each other.

Horizontal surface 23 and horizontal surface 25 are parallel to each other, and substrate 11 is formed such that an outer diameter side of center cylindrical portion 13 is notched. In the same manner, substrate 14 is formed such that an outer diameter side of center cylindrical portion 15 is notched.

In the first exemplary embodiment, inclination angle E which inclined surface 22 makes with respect to horizontal surface 23 and inclination angle F which inclined surface 26 makes with respect to horizontal surface 25 may be set to an angle of approximately 30 degrees (25 degrees to 35 degrees), for example.

An occupying ratio of inclined surface 22 with respect to horizontal surface 23 in thin wall portion 21 may be small or large. Further, inclined surface 22 may have the substantially equal occupying ratio as horizontal surface 23. An occupying ratio of inclined surface 26 with respect to horizontal surface 23 in thin wall portion 27 may be small or large. Further, inclined surface 26 may have the substantially equal occupying ratio as horizontal surface 23.

[1-1-2. Disk Cartridge]

Figure 3:
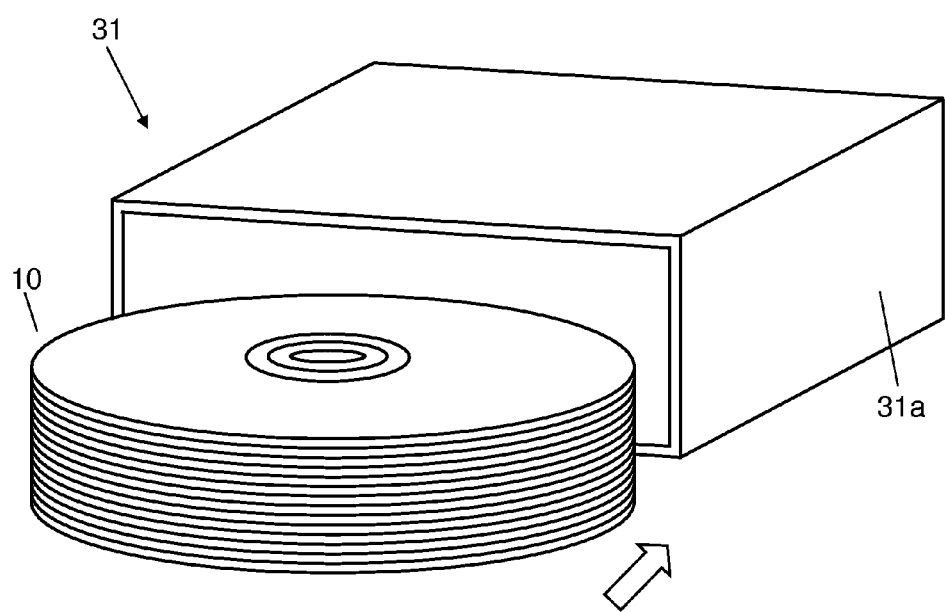
FIG. 3 is a perspective view of the optical disks according to the first exemplary embodiment in a state where the optical disks are stored in a disk cartridge in a stacked manner.

FIG. 3 is a view showing a state of disk cartridge 31 (one example of disk cartridge) where a plurality of optical disks 10 are stored in the inside of case 31a in a stacked state. Disk cartridge 31 is mounted in information recording and reproducing apparatus 50 (FIG. 5) described later in a state where the plurality of optical disks 10 are stacked.

Figure 4:
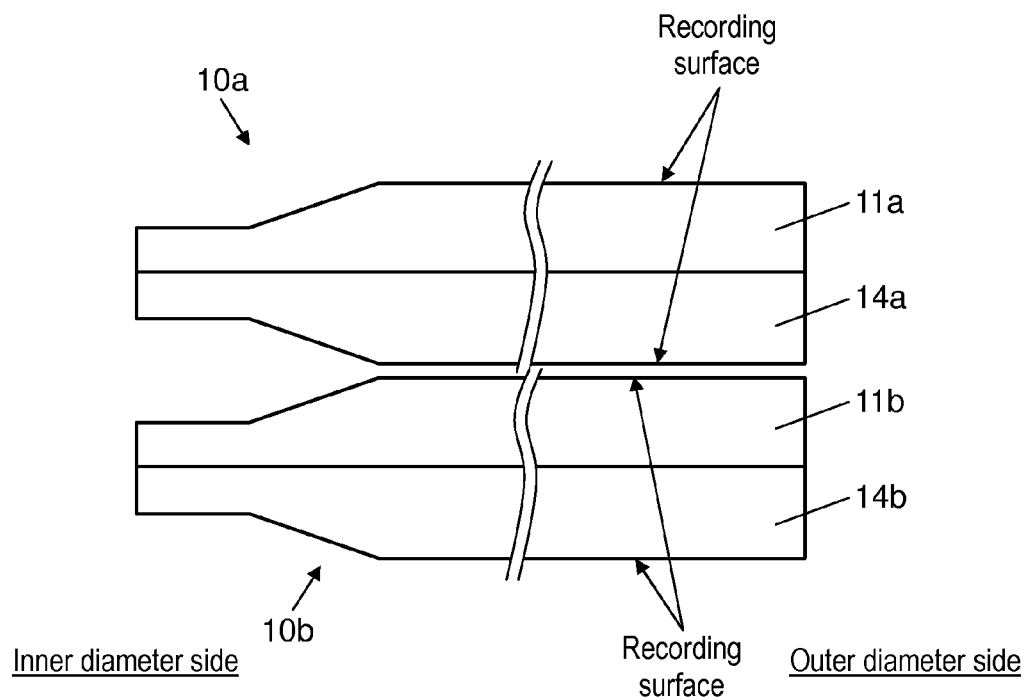
FIG. 4 is a cross-sectional view showing a state where the optical disks according to the first exemplary embodiment overlap with each other.

FIG. 4 shows a state where two optical disks 10 are stacked to each other. Optical disk 10a on an upper side includes substrate 11a and substrate 14a, and optical disk 10b on a lower side includes substrate 11b and substrate 14b. By storing a plurality of optical disks 10 of the first exemplary embodiment in disk cartridge 31 in a directly overlapping manner, optical disks 10 can be used as a cartridge-type recording medium of large capacity. In FIG. 4, for facilitating the description of the exemplary embodiment, the example where two optical disks 10a, 10b are stacked is shown. However, the number of optical disks may be three or more.

[1-1-3. Information Recording and Reproducing Apparatus]

FIG. 5 schematically shows the configuration of information recording and reproducing apparatus 50 (one example of information recording and reproducing apparatus) according to the present exemplary embodiment. Information recording and reproducing apparatus 50 performs recording or reproduction of information with respect to optical disks 10 stored in disk cartridge 31. Information recording and reproducing apparatus 50 includes: optical pickup drive device 51; optical pickup 52; motor 54; turntable 56; and clamper 55. Information recording and reproducing apparatus 50 also includes electric circuit 53 (one example of electric circuit) which controls recording or reproduction of information with respect to optical disk 10. Information recording and reproducing apparatus 50 further includes: separation arm 58 which takes out optical disk 10 from disk cartridge 31; and arm drive circuit 59 for driving separation arm 58.

Optical pickup 52 is driven by optical pickup drive device 51, and transmits a focus signal, a tracking signal, a gap signal and an RF signal to electric circuit 53 in accordance with a position of optical pickup 52 from optical disk 10. In response to these signals, electric circuit 53 transmits a signal for driving an object lens actuator to optical pickup 52. Upon receiving this signal, optical pickup 52 performs a focus control, a tracking control, a gap control and a tilt control with respect to optical disk 10, thus performing reading, writing or erasing of information.

Disk cartridge 31 stores a plurality of optical disks 10 in the inside thereof in a stacked state as described above, and is set in the inside of information recording and reproducing apparatus 50 by an operation of a user. Separation arm 58 takes out optical disk 10 in the inside of disk cartridge 31 in accordance with a control performed by arm drive circuit 59, and moves optical disk 10 to a tray for setting optical disk 10 on turntable 56. Optical disk 10 which is taken out is mounted on turntable 56 so that optical disk 10 is brought into a state where recording or reproduction of information can be performed by optical pickup 52 as described above.

Optical disk 10 according to the present exemplary embodiment can record information on both surfaces thereof and hence, before optical disk 10 is moved to the tray for setting optical disk 10 on turntable 56, optical disk 10 may be inversed by a disk inversing mechanism when necessary. Alternatively, after information is recorded on one surface of all optical disks 10 in the inside of the disk cartridge, the direction of disk cartridge 31 may be inversed manually, and information may be recorded on the other surface of all optical disks. Further, optical pickup 52 may be disposed on both sides of optical disk 10.

[1-2. Operation]

Figure 6A:
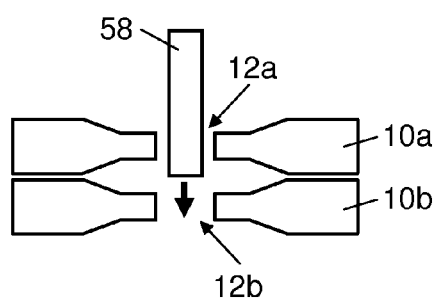
FIG. 6A is a side view showing a state where a separation arm is inserted into through holes formed at the center of the stacked optical disks according to the first exemplified embodiment.
Figure 6E:
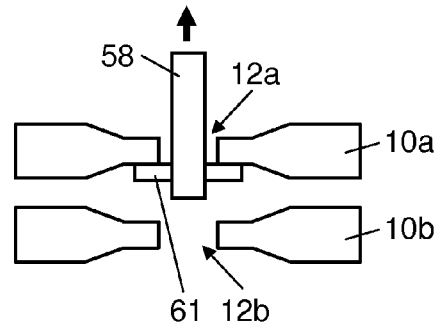
FIG. 6E is a side view showing a state immediately after the stacked optical disks according to the first exemplary embodiment are separated from each other.
Figure 6B:
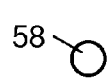
FIG. 6B is a plan view of the separation arm according to the first exemplary embodiment in a state shown in FIG. 6A as viewed from above.
Figure 6F:
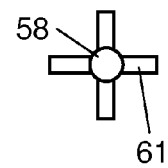
FIG. 6F is a plan view of the separation arm in a state show in FIG. 6E as viewed from above.
Figure 6C:
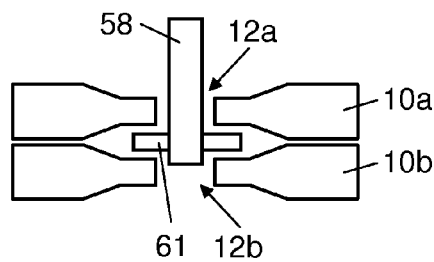
FIG. 6C is a side view showing a state immediately before the stacked optical disks according to the first exemplary embodiment are separated from each other.
Figure 6D:
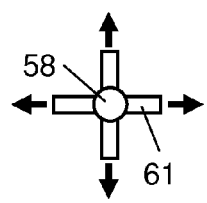
FIG. 6D is a plan view of the separation arm in the state shown in FIG. 6C as viewed from above.

FIG. 6A to FIG. 6F are explanatory views for describing a method of separating a plurality of stacked optical disks 10a, 10b. The plurality of stacked optical disks can be separated from each other by controlling the above-mentioned separation arm 58. FIG. 6A is a side view showing a state where separation arm 58 is inserted into through holes 12a, 12b formed at the center of stacked optical disks 10a, 10b. FIG. 6B is a plan view of separation arm 58 in a state shown in FIG. 6A as viewed from above. FIG. 6C is a side view of stacked optical disks 10a, 10b in a state immediately before stacked optical disks 10a, 10b are separated from each other. FIG. 6D is a plan view of separation arm 58 in a state shown in FIG. 6C as viewed from above. FIG. 6E is a side view showing a state immediately after stacked optical disks 10a, 10b are separated from each other. FIG. 6F is a plan view of separation arm 58 in a state shown in FIG. 6E as viewed from above.

As shown in FIG. 6A and FIG. 6B, firstly, separation arm 58 is lowered so that separation arm 58 passes through through hole 12a formed in optical disk 10a on an upper side, and lowering of separation arm 58 is stopped immediately before separation arm 58 passes through through hole 12b formed in optical disk 10b on a lower side.

Then, as shown in FIG. 6C and FIG. 6D, four pawls 61 project from separation arm 58 at intervals of approximately 90 degrees, and extend toward spaces each of which is formed by a notch on a lower side at the center of optical disk 10a (corresponding to thin wall portion 27 in FIG. 2) and a notch on an upper side at the center of optical disk 10b (corresponding to thin wall portions 21 in FIG. 2).

Subsequently, as shown in FIG. 6E and FIG. 6F, separation arm 58 is elevated while maintaining pawls 61 in an extending state so that pawls 61 are brought into contact with a surface of a lower side of the thin wall portion of optical disk 10a on an upper side. Then, in a state where pawls 61 support optical disk 10a, separation arm 58 and optical disk 10a are elevated integrally. Accordingly, optical disk 10a and optical disk 10b are separated from each other.

As described above, by making use of the thin wall portion formed at the center of the substrate of optical disk 10, optical disks 10 which are directly stacked to each other can be separated from each other. In the above-mentioned configuration, it is important that the thin wall portion has a wide space for normally separating optical disks 10 from each other. However, any foreign substance such as a dust is liable to stagnate in the thin wall portion. In this case, pawls 61 cannot maintain optical disk 10a on an upper side at the accurate position and hence, there arises a possibility that the operation of separation arm 58 will become unstable or pawl 61 will be broken.

Hereinafter, the relationship between the thin wall portion of optical disk 10 and a foreign substance is described with reference to FIG. 7. FIG. 7 is a view showing one example of the behavior of foreign substances in a substrate separated state and a substrate immediately-before-separation state with respect to optical disk 10 according to the present exemplary embodiment and optical disk 71 according to a comparison example. Optical disk 10 is the optical disk according to the first exemplary embodiment where an inclination angle made between a horizontal surface and an inclined surface of a thin wall portion at a substrate center portion is set to approximately 30 degrees. On the other hand, in optical disk 71, an inclination angle between a horizontal surface and an inclined surface of a thin wall portion at the center of a substrate is set to approximately 90 degrees.

Firstly, the substrate separated state is described. The substrate separated state is a state where the substrate exists in a single form. For example, the substrate separated state is a state taken on during the movement of an optical disk by separation arm 58, a state taken on immediately after the optical disk is moved to a tray for guiding the optical disk to turntable 56 and an optical disk is placed on turntable 56 or a state where an optical disk is taken out from disk cartridge 31. Also with respect to stacked substrates, the uppermost substrate is treated as being in a substrate separated state.

Firstly, in optical disk 10, any foreign substance which falls from above as indicated by numeral 72 will leap back onto an inclined surface and move away from optical disk 10. Alternatively, a foreign substance will go downward while rolling on an inclined surface as indicated by numeral 73, and will roll on a horizontal surface as it is, and move away from optical disk 10. That is, optical disk 10 has an advantageous effect that a foreign substance will minimally adhere to optical disk 10 due to the formation of the inclined surface.

On the other hand, optical disk 71 has no inclined surface as indicated by 74 and hence, any foreign substance which falls from above will likely to stay or stagnate on the horizontal surface as it is.

Next, the substrate immediately-before separation state is described. The substrate immediately-before separation state is a state where pawls 61 project from separation arm 58 and extend toward the inside of thin wall portion at the center of the substrate for separating a plurality of stacked substrates (state shown in FIG. 6C and FIG. 6D).

Firstly, in optical disk 10, a force in the lateral direction is applied to any foreign substance on the horizontal surface due to pawls 61 as indicated by numeral 75 and hence, this foreign substance will slide obliquely in the upward direction along the inclined surface.

On the other hand, in optical disk 71, although any foreign substance on the horizontal surface will move toward a deep side due to pawls 61 as indicated by numeral 76, when this foreign substance stagnates at a deep side, the foreign substance cannot move any further and, eventually, there is a possibility that this foreign substance will stop the movement of pawls 61 or the direction that pawls 61 move will be deviated.

As described previously, optical disk 10 according to the present exemplified embodiment has the inclined surface on the thin wall portion at the center of the substrate and hence, any foreign substance can easily move. As a result, this foreign substance minimally stagnates and hence, the present exemplified embodiment can acquire an advantageous effect that the foreign substance will not obstruct the substrate separating operation.

As has been described above, the present exemplified embodiment can prevent the adhesion or the stagnation of a foreign substance in the thin wall portion by forming the inclined surface on the thin wall portion at the center of the substrate of optical disk 10.

Optical disk 10 according to the present exemplified embodiment is an optical disk capable of recording information on both surfaces, the optical disk being formed by laminating two substrates to each other symmetrically in a front-and-back direction. Here, with reference to FIG. 8, the description is made with respect to an optical disk capable of recording information on both surfaces which is formed by laminating two substrates to each other asymmetrically in a front-and-back direction.

In FIG. 8, numeral 81 indicates the case where optical disks 10 each of which is formed by stacking the substrates symmetrically in a front-and-back direction, and numeral 82 indicates the case where optical disks 10 each of which is formed by laminating the substrates symmetrically in a front-and-back direction to each other are stacked and, at the same time, the second disk from the top has a front surface and a back surface thereof inversed up-side-down. In both cases, a space which allows the extension of pawls 61 of separation arm 58 is secured. On the other hand, in the case indicated by numeral 84 where optical disks 81 each of which is formed by laminating the substrates asymmetrically in a front-and-back direction are stacked, a space which allows the extension of pawls 61 of separation arm 58 cannot be secured. That is, when optical disks are wrongly disposed at the time of initially storing the optical disks in disk cartridge 31, there arises a drawback that the optical disks cannot be separated from each other.

Optical disk 10 according to the present exemplified embodiment is formed by laminating the substrates such that the substrates are symmetrical in a front-and-back direction and hence, the optical disks can be separated from each other regardless of the disposition of the optical disks at the time of storing the optical disks in disk cartridge 31.

[1-3. Advantageous Effects and the Like]

As described above, optical disk 10 according to the present exemplified embodiment includes thin wall portion 21 formed on an outer diameter side of through hole 12 at the center of substrate 11 on the front surface thereof, and thin wall portion 21 has horizontal surface 23 and inclined surface 22. Accordingly, the present exemplified embodiment can prevent the adhesion or the stagnation of a foreign substance on the inner diameter portion of substrate 11, that is, on the periphery of through hole 12 and hence, it is possible to prevent the deterioration of quality of optical disk 10.

Further, optical disk 10 according to the present exemplified embodiment includes thin wall portion 27 formed on an outer diameter side of through hole 12 at the center of substrate 14 also on the back surface thereof, and thin wall portion 27 has horizontal surface 25 and inclined surface 26. Accordingly, the present exemplified embodiment can prevent the adhesion or the stagnation of any foreign substance on the inner diameter portion of substrate 14, that is, on the periphery of through hole 12 and hence, it is possible to prevent the deterioration of quality of optical disk 10.

Further, disk cartridge 31 according to the present exemplified embodiment stores a plurality of stacked optical disks 10 therein, each of optical disks 10 includes the thin wall portion formed on the outer diameter side of the through hole at the center of the substrate, and the thin wall portion has the horizontal surface and the inclined surface. Accordingly, even when optical disks 10 are used in a stacked state in disk cartridge 31, stacked optical disks 10 can be accurately separated from each other and, at the same time, it is possible to prevent the deterioration of quality of optical disks 10.

Further, optical disk 10 has the symmetrical structure in the front-and-back direction by laminating the substrates to each other and hence, optical disks 10 can be separated from each other with certainty regardless of the disposition of optical disks 10 at the time of storing optical disk 10 in disk cartridge 31.

Second Exemplified Embodiment 2-1. Constitution

Figure 9:
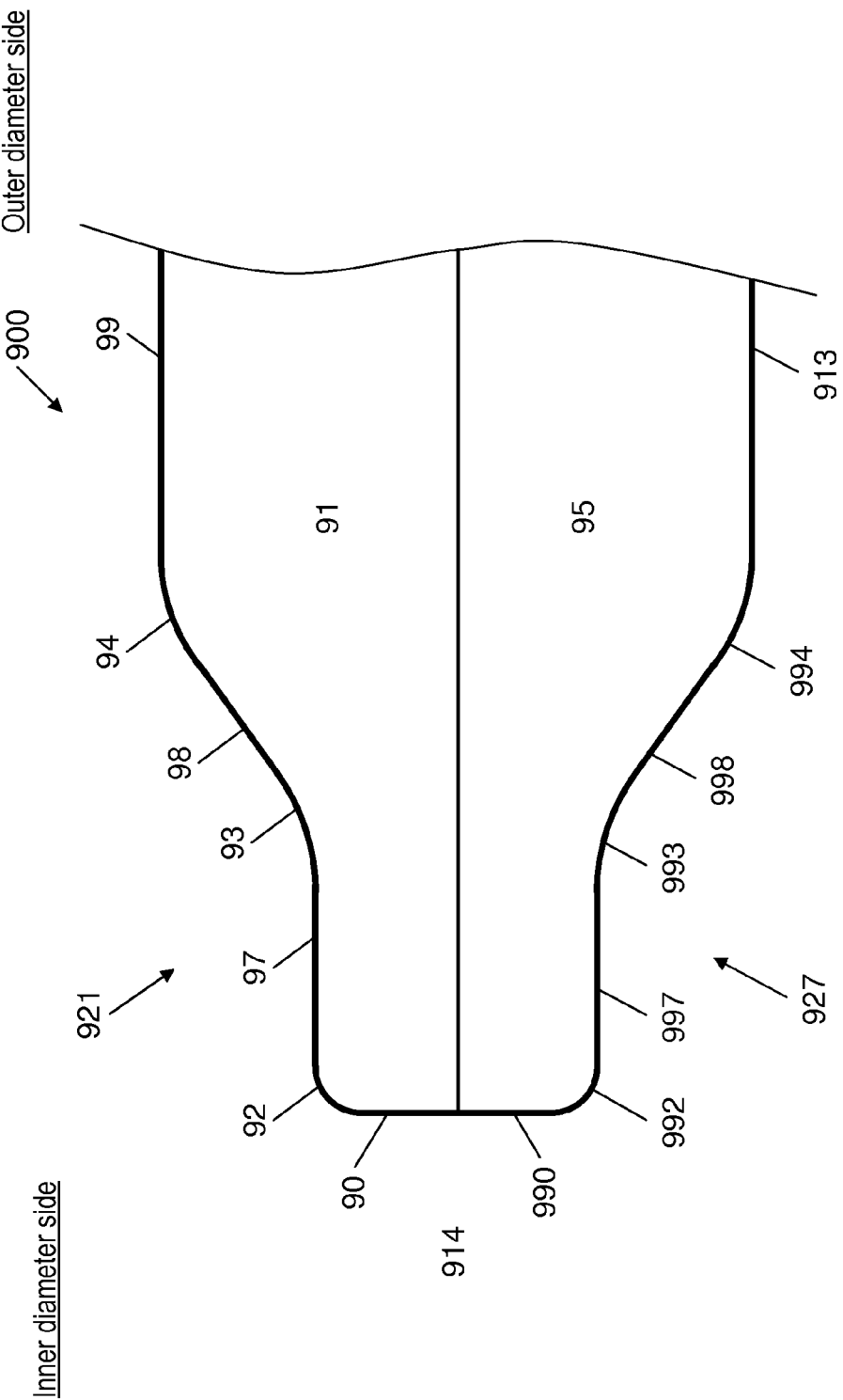
FIG. 9 is a cross-sectional view showing the structure of a center portion of an optical disk according to a second exemplary embodiment.

FIG. 9 is a cross-sectional view of optical disk 900 (one example of disk-shaped information recoding medium) according to a second exemplified embodiment. Optical disk 900 is formed by laminating substrate 91 and substrate 95 to each other, and thin wall portions 921, 927 are respectively formed at the center of substrate 91 and substrate 95. Optical disk 900 according to the present exemplified embodiment differs from optical disk 10 according to the first exemplified embodiment with respect to a point that optical disk 900 according to the present exemplified embodiment has three curvature portions 92, 93, 94 on substrate 91 and three curvature portions 992, 993, 994 on substrate 95. Other configurations of optical disk 900 are substantially equal to the corresponding configurations of optical disk 10.

Curvature portion 92 is formed on an outer edge of through hole 914, that is, between outer diameter 90 of a center cylindrical portion and horizontal surface 97. Curvature portion 93 is formed between horizontal surface 97 and inclined surface 98. Curvature portion 94 is formed between inclined surface 98 and horizontal surface 99 corresponding to a recording surface of substrate 91.

In the same manner, curvature portion 992 is formed on an outer edge of through hole 914, that is, between outer diameter 990 of a center cylindrical portion and horizontal surface 997. Curvature portion 993 is formed between horizontal surface 997 and inclined surface 998. Curvature portion 994 is formed between inclined surface 998 and horizontal surface 913 corresponding to a recording surface of substrate 95.

2-2. Advantageous Effects and the Like

As described above, according to optical disk 900 of the present exemplified embodiment, in addition to the advantageous effects acquired by the first exemplified embodiment, since the thin wall portion formed at the center of substrate 91 has curvature portions 92, 93, 94, it is possible to further easily and effectively remove any foreign substance in a substrate separated state and a substrate immediately before separation state shown in FIG. 7, for example. To be more specific, due to the formation of curvature portion 92, any foreign substance which adheres to an inner diameter side of horizontal surface 97 will easily slip down into through hole 914 from horizontal surface 97. Due to the formation of curvature portion 93, a foreign substance will go downward while rolling on inclined surface 98, move on horizontal surface 97 smoothly without substantially decreasing a speed and, thereafter, roll on horizontal surface 97 and fall in through hole 914, and can be removed from substrate 91. Further, due to the formation of curvature portion 94, when pawls 61 of separation arm 58 (FIG. 6A) are inserted, any foreign substance will slide upward on inclined surface 98 in an oblique upward direction and hence, it is possible to prevent a stagnating foreign substance from obstructing a separating operation by pawls 61 (FIG. 6E).

Further, when the direction of the optical disk is inversed upside down, due to the formation of curvature portion 992, any foreign substance which adheres to an inner diameter side of horizontal surface 997 will easily slip down into through hole 914 from horizontal surface 997. Due to the formation of curvature portion 993, a foreign substance will go downward while rolling on inclined surface 998, move on horizontal surface 997 smoothly without substantially decreasing a speed and, thereafter, roll on horizontal surface 997 and fall in through hole 914, and can be removed from substrate 95. Further, due to the formation of curvature portion 994, when pawls 61 of separation arm 58 (FIG. 6A) are inserted, any foreign substance will slide upward on inclined surface 998 in an oblique upward direction and hence, it is possible to prevent a stagnating foreign substance from obstructing a separating operation by pawls 61 (FIG. 6E).

2-3. Modification

It is not always necessary that the above-mentioned all curvature portions 92, 93, 94, 992, 993, 994 be formed. It is sufficient that only one or two curvature portions are formed.

Third Exemplified Embodiment 3-1. Constitution

[3-1-1. Optical Disk]

Figure 10:
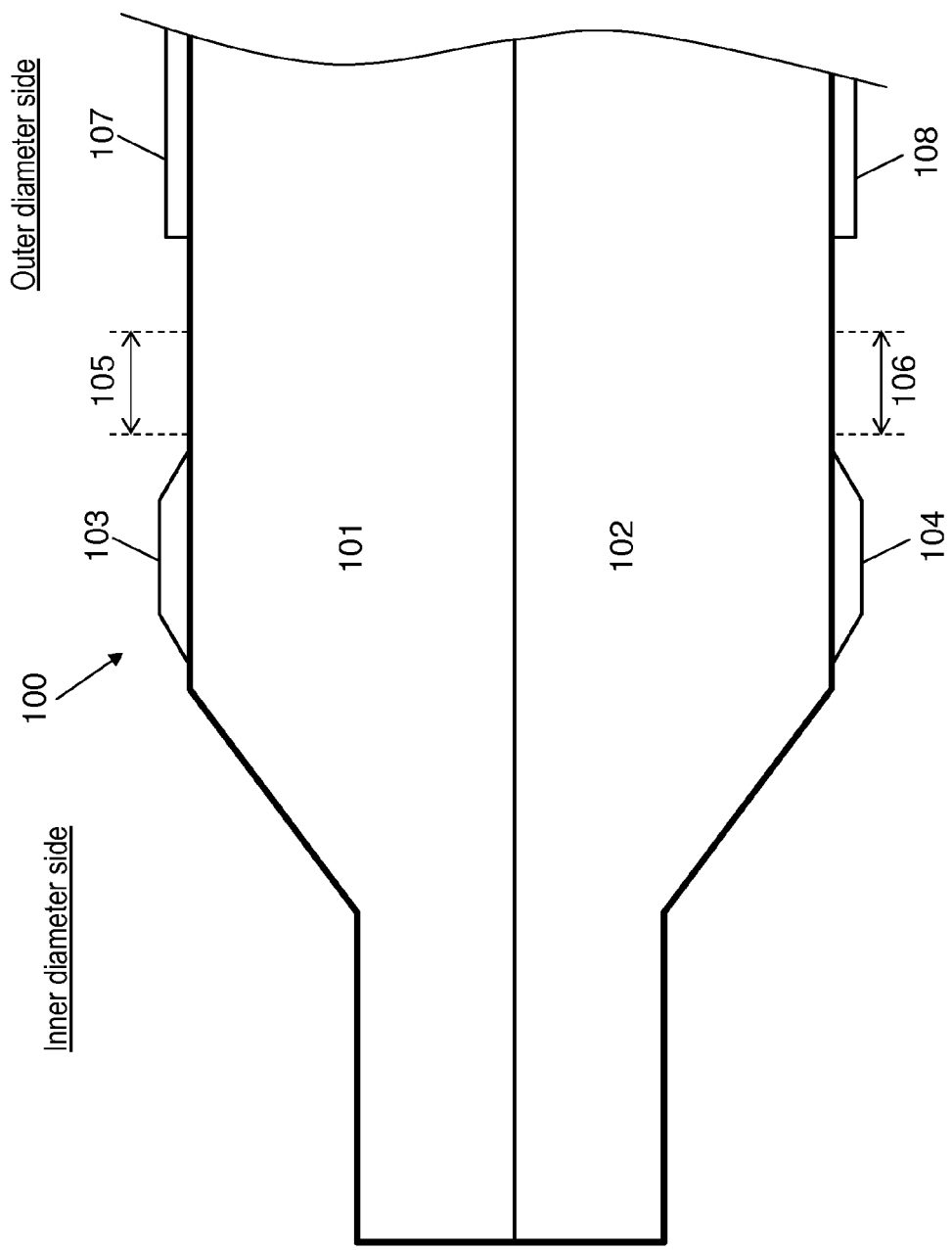
FIG. 10 is a cross-sectional view showing the structure of a center portion of an optical disk according to a third exemplary embodiment.

FIG. 10 is a cross-sectional view of optical disk 100 (one example of disk-shaped information recording medium) according to a third exemplified embodiment. Optical disk 100 according to the third exemplary embodiment differs from optical disk 10 according to the first exemplified embodiment and optical disk 900 according to the second exemplified embodiment with respect to a point that optical disk 100 according to the third exemplified embodiment includes first rib 103 and second rib 104 having a circular annular shape on both surfaces thereof. Further, in optical disk 100, first clamp region 105 and film forming region 107 which includes a recording film and a cover layer are formed on a front surface side, and second clamp region 106 and film forming region 108 which includes a recording film and a cover layer are formed on a back surface side.

In optical disk 100, due to the formation of first rib 103 and second rib 104, when a plurality of optical disks 100 are stacked as shown in FIG. 3, it is possible to prevent the occurrence of a case where a region which stores and reproduces data is damaged due to the collision of two film forming regions. Further, in the case of the stacked optical disks described with reference to FIG. 6, it is possible to prevent the occurrence of the case where two film forming regions are adhered to each other due to a contact therebetween resulting in the optical disks being unable to be separated from each other. Still further, a gap formed between the stacked optical disks can be increased by first rib 103 and second rib 104 and hence, pawls 61 of separation arm 58 can be easily inserted between the optical disks thus facilitating the optical disk separating operation.

When optical disk 100 is placed on a tray or the like in a separation state, first rib 103 or second rib 104 is brought into contact with a surface of the tray. Accordingly, it is possible to prevent the occurrence of the case where film forming region 107 or film forming region 108 in which data is recorded is damaged by being brought into contact with the surface of the tray or the occurrence of the case where a dust on the surface of the tray adheres to the region where data is recorded or reproduced.

[3-1-2. Position of Clamp Region]

Next, with respect to optical disk 100 according to the present exemplified embodiment, the positional relationship between first clamp region 105 and film forming region 107 and the positional relationship between second clamp region 106 and film forming region 108 are described. As shown in FIG. 10, first clamp region 105 is formed such that first clamp region 105 does not overlap with film forming region 107. In the same manner, second clamp region 106 is formed such that second clamp region 106 does not overlap with film forming region 108.

Figure 11A:
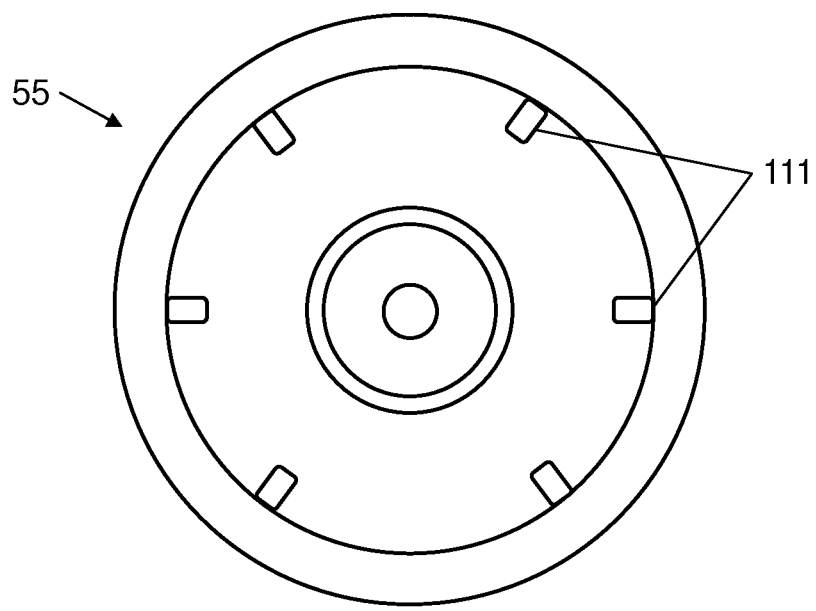
FIG. 11A is a plan view of a clamper in an information recording and reproducing apparatus for an optical disk.
Figure 11B:
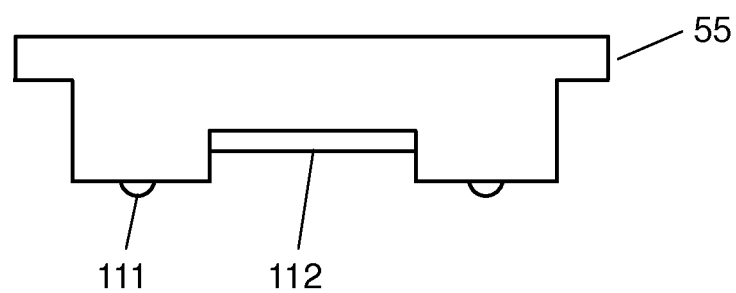
FIG. 11B is a cross-sectional view of the damper in the information recording and reproducing apparatus for the optical disk.

FIG. 11A is a plan view of clamper 55 (FIG. 5) of information recording and reproducing apparatus 50. FIG. 11B is a cross-sectional view of clamper 55 of information recording and reproducing apparatus 50. Clamper 55 includes projecting portions 111 and metal portion 112.

Figure 12A:
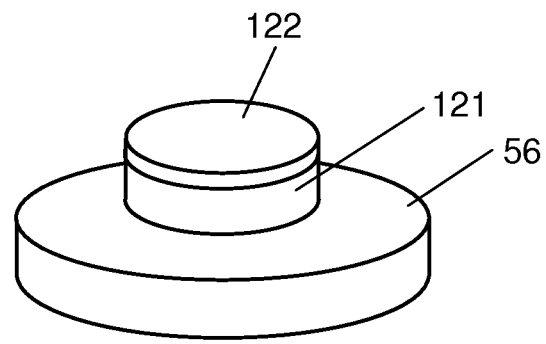
FIG. 12A is a perspective view of a turntable in the information recording and reproducing apparatus for an optical disk.
Figure 12B:
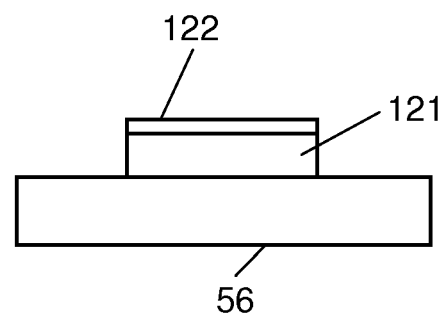
FIG. 12B is a cross-sectional view of the turntable in the information recording and reproducing apparatus for the optical disk.

FIG. 12A is a perspective view of turntable 56 (FIG. 5) of information recording and reproducing apparatus 50. FIG. 12B is a cross-sectional view of turntable 56 of information recording and reproducing apparatus 50. Turntable 56 includes: center projection portion 121 for holding the center cylindrical portion of the optical disk; and a magnet portion 122 mounted on an upper portion of center projecting portion 121.

At the time of performing an information recording or reproducing operation, optical disk 100 is moved to a position above turntable 56 and, thereafter, optical disk 100 is placed on turntable 56 by inserting center projecting portion 121 of turntable 56 into through hole 12 formed at the center of optical disk 100. Then, optical disk 100 is clamped between clamper 55 from above and turntable 56. At this stage of operation, metal portion 112 of clamper 55 and magnet portion 122 of turntable 56 attract each other and hence, the position of optical disk 100 is fixed. Recording or reproducing of information with respect to optical disk 100 is performed while turntable 56 is rotated by motor 54 (see FIG. 5). Further, at this stage of operation, projecting portions 111 of clamper 55 are brought into contact with the clamp region of optical disk 100.

Figure 13A:
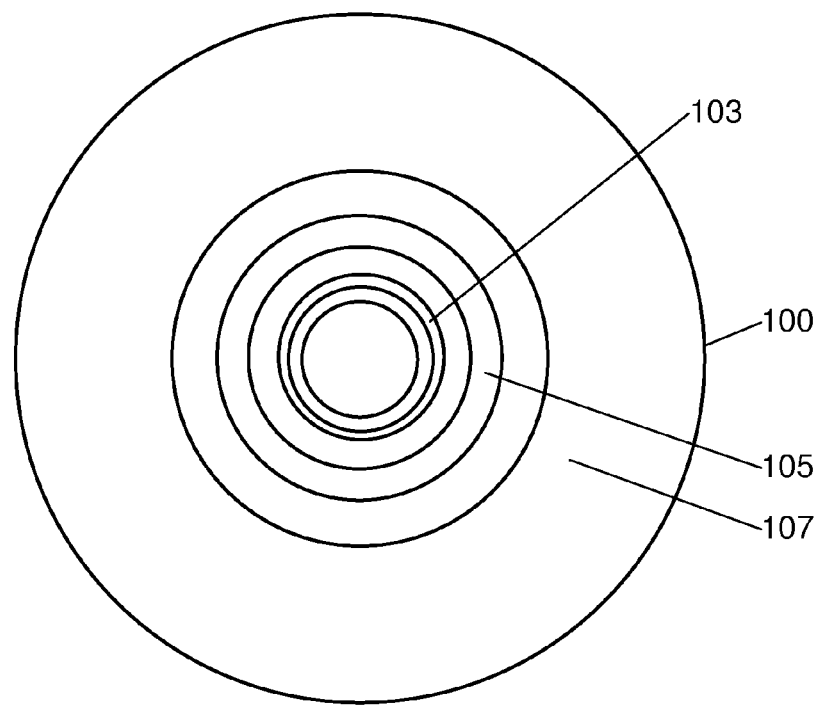
FIG. 13A is a plan view of an optical disk formed such that a clamp region and film forming region do not overlap with each other.
Figure 13B:
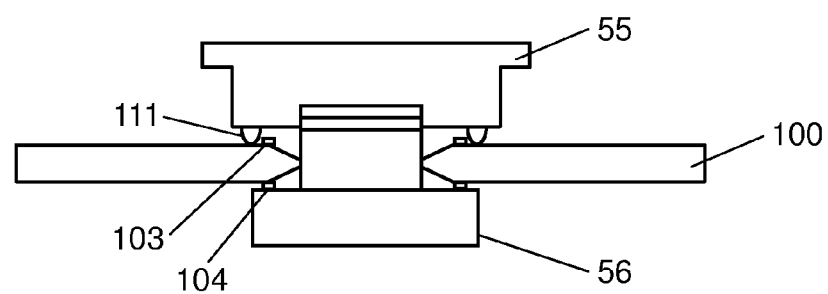
FIG. 13B is a cross-sectional view of the optical disk according to a third exemplary embodiment in a state where the optical disk is set on the information recording and reproducing apparatus.

FIG. 13A is a plan view of optical disk 100 formed such that first clamp region 105 and film forming region 107 do not overlap with each other. FIG. 13B is a cross-sectional view showing a state where optical disk 100 is gripped by clamper 55 on turntable 56.

As shown in FIG. 13B, at the time of performing a recording or reproducing operation with respect to optical disk 100, a load is applied to projecting portions 111 of clamper 55 and second ribs 104. Accordingly, as heights of projecting portions 111 and second ribs 104 are set to be higher, a space formed between an inner peripheral portion of optical disk 100 and clamper 55 and a space formed between an inner peripheral portion of optical disk 100 and turntable 56 become wider. Accordingly, the recording or reproducing operation is influenced by air resistance and hence, power consumption is increased.

Accordingly, it is desirable to set the heights of first ribs 103 and second ribs 104 as low as possible within a range where an advantageous effects described above, that is, the protection of the recording and reproducing regions and the ease of separation of stacked optical disks can be realized. It is more preferable that the heights of first ribs 103 and second ribs 104 be set to 150 micrometer or less.

When projecting portion 111 is brought into contact with film forming region 107, there is a possibility that a defect such as a crack will occur in film forming region 107 due to a pressure applied to projecting portion 111. Further, when optical disk is repeatedly loaded, the above-mentioned defect spreads so that there may be a case where recording or reproduction of information by the optical disk cannot be performed eventually. By forming first clamp region 105 and film forming region 107 such that these regions do not overlap with each other as in the case of optical disk 100 according to the present exemplified embodiment, the rupture of film forming region 107 by projecting portion 111 can be prevented.

Film forming region 107 includes at least a recording region and a cover region which is formed on a front surface side of the recording region. Provided that the cover region is not deteriorated due to a contact with a clamper 55 and the recording region is formed on a more outer diameter side and a outer peripheral side of the cover region, the clamp region and the film forming region may abut each other so long as the clamp region and the recording region do not abut each other.

In optical disk 100 according to the present exemplified embodiment, first rib 103 and second rib 104 are formed on an inner diameter side of first clamp region 105 and second clamp region 106. Due to such a configuration, the recording region can be increased compared to the case where the ribs are formed on an outer diameter side of the clamp region while realizing the advantageous effects described above, that is, the protection of recording and reproducing regions and the ease of separation of stacked optical disks.

3-2. Modifications

[3-2-1. Modification 1]

FIG. 14 shows a modification of optical disk 100 according to the present exemplified embodiment. Differing from optical disk 100, optical disk 150 further includes first printing region 151 and second printing region 152. First printing region 151 and first clamp region 102 are separated from each other. In the same manner, second printing region 151 and second clamp region 102 are separated from each other. The printing region and the clamp region are disposed such that these regions do not overlap with each other and hence, it is possible to prevent the rupture of first printing region 151 or second printing region 152 by projection portion 111 of clamper 55, and the generation of dust caused by clamping first printing region 151 and second printing region 152. Further, projection portions 111 of clamper 55 are brought into contact with uneven portions of printing portions on first printing region 151 and second printing region 152 so that it is possible to prevent the generation of a play in optical disk 150 at the time of clamping.

Printing is performed by using an acrylic resin paste containing pigment, for example, wherein a printed portion is cured by UV irradiation. With respect to an undercoat for the printing portion, the undercoat is formed by a generally known method which uses a paste, for example. In the present exemplified embodiment, as such a paste, a paste which contains 25 to 30 weight % of urethane resin and 70 to 75 weight % of an acrylic resin is used. This paste is applied by coating by a printing method which uses a screen plate made of polyester and, thereafter, a coated paste is cured by UV irradiation. With respect to a urethane resin, when an average value of particle size distribution is approximately 3.5 µm to 5.0 µm, an undercoat portion is slightly formed into an uneven shape. Accordingly, when the rib wears in a state where optical disks overlap with each other, for example, or even when the rib is not formed, it is possible to prevent the occurrence of the case where the optical disks are adhered to each other so that the optical disks cannot be separated from each other.

The undercoat and the print may be formed by methods which differ from the above-mentioned method.

The same content may be printed on first printing region 151 and second printing region 152 for the purpose of identifying a kind and a recording capacity of an optical disk, or information which distinguishes the surfaces of the optical disk may be printed on first printing region 151 and second printing region 152. Further, a kind or a recording capacity of an optical disk can be distinguished such that the difference in color between the printing regions, prints other than characters and the numerals may be applied to first printing region 151 and second printing region 152.

Further, to distinguish surfaces of an optical disk from each other, in place of prints applied to printing regions, information such as alphabets and numerals may be marked on a substrate by a laser marker or the like. Further, marking may be applied to only one surface of the optical disk.

With respect to optical disk 150 capable of recording information on both surfaces, provided that both surfaces can be distinguished from each other, and effects such as the generation of a play in optical disk 150 at the time of clamping are not generated, the printing region may be formed only one side of the optical disk.

Further, in optical disk 150 according to the present exemplified embodiment, first printing region 151 and film forming region 107 are separated from each other. In the same manner, second printing region 152 and film forming region 108 are separated from each other. By disposing the printing region and the film forming region such that these regions do not overlap with each other, it is possible to prevent the deterioration of the film forming region caused by intrusion of a printing material into a film forming region.

In optical disk 150 of the present exemplified embodiment, first printing region 151 is disposed at the position different from film forming region 107. However, provided that there is no effect on distinction in first printing region 151 and there is no effect on recording in film forming region 107, first printing region 151 and film forming region 107 may partially overlap with each other. In the same manner, second printing region 152 is disposed at the position different from film forming region 108. However, provided that there is no effect on distinction in second printing region 152 and there is no effect on recording in film forming region 108, second printing region 152 and film forming region 108 may partially overlap with each other. Further, when the film forming region is formed of a plurality of films, only some films may overlap with each other.

[3-2-2. Modification 2]

In optical disk 150 capable of recording information on both surfaces, the positions of first printing region 151 and second printing region 152 are not limited to the outer sides of substrates 101, 102, that is, the recording surface sides of substrates 101, 102. First printing region 151 and second printing region 152 may be formed on inner sides of substrates 101, 102, that is, the sides of substrates 101, 102 which are laminated to each other.

Figure 15A:
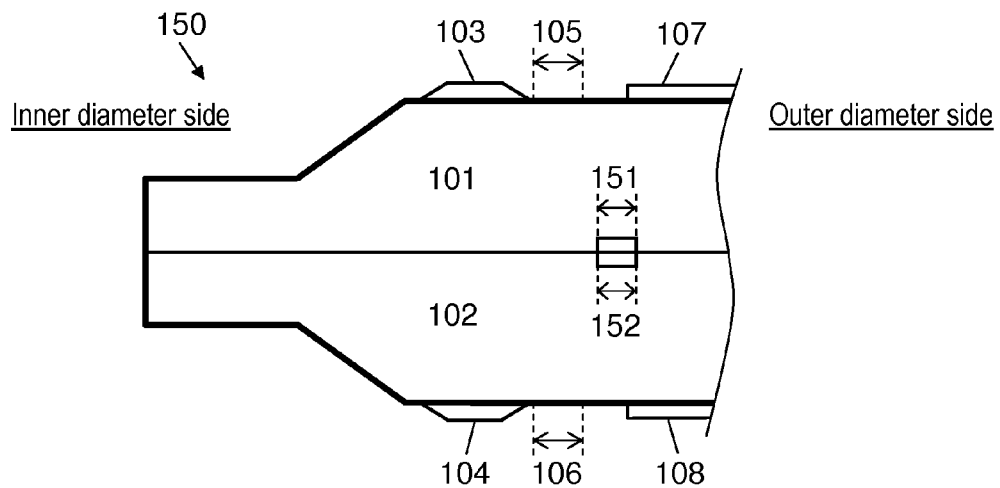
FIG. 15A is a cross-sectional view of an optical disk according to a modification of the third exemplary embodiment where a printing region is formed on an inner side of a substrate.
Figure 15B:
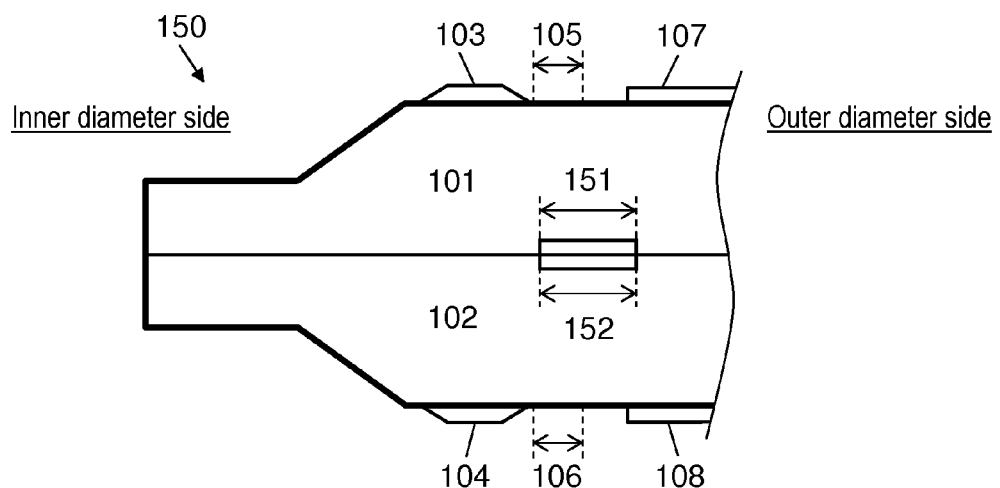
FIG. 15B is a cross-sectional view of an optical disk where a printing region is formed on a side where a substrate is laminated and a radial position of the printing region overlaps with a clamp region.

FIG. 15A shows the example of optical disk 150 where first printing region 151 and second printing region 152 are formed on inner sides of substrates 101, 102, that is, the sides of substrates 101, 102 which are laminated to each other. FIG. 15B shows the example of optical disk 150 where first printing region 151 and second printing region 152 are formed on the sides of substrates 101, 102 which are laminated to each other, and the radial positions of first printing region 151 and second printing region 152 overlap with first clamp region 105 and second clamp region 106.

As described previously, substrates 101, 102 are made of a transparent resin material such as polycarbonate and hence, printing portions on first printing region 151 and second printing region 152 can be visually recognized from the outside even when printing portions are formed in the inside of the substrates.

In both examples shown in FIG. 15A and FIG. 15B, there is no possibility that clamper 55 will be brought into contact with first printing region 151 and second printing region 152 in the inside of the substrates. Accordingly, it is possible to prevent the rupture of first printing region 151 and second printing region 152 due to projecting portions 111 of damper 55 and the generation of dust caused by clamping first printing region 151 and second printing region 152. Further, it is also possible to prevent a play which may be generated in optical disk 150 at the time of clamping due to a contact between projecting portions 111 of clamper 55 and uneven portions of the printing portions on first printing region 151 and second printing region 152. Still further, as shown in FIG. 15B, there arises no problem even when the radial position of first printing region 151 and the radial position of second printing region 152 overlap with radial position of first clamp region 105 and hence, first printing region 151 and second printing region 152 can be widely formed.

First printing region 151 and second printing region 152 shown in FIG. 15A and FIG. 15B may be formed only on one side of an optical disk so long as both surfaces can be distinguished from each other. Although first printing region 151 and second printing region 152 shown in FIG. 15A and FIG. 15B overlap with each other with respect to the radial position, these printing regions may be formed in a non-overlapping manner or may be formed in a state where the printing regions are displaced from each other.

3-3. Advantageous Effects

As described above, in optical disk 150 according to the present exemplified embodiment, in addition to the advantageous effects of previously-mentioned first and second exemplified embodiments, due to the formation of first rib 103 and second rib 104, when a plurality of optical disks 150 are stacked, it is possible to prevent the occurrence of a case where a region which stores and reproduces data is damaged due to the collision of the film forming region of optical disk 100 on an upper side and the film forming region of optical disk 150 on a lower side.

In separating stacked optical disks 150, it is possible to prevent two film forming regions from being adhered to each other due to a contact therebetween. Further, a gap formed between stacked optical disks 150 can be increased by first rib 103 and second rib 104 and hence, pawls 61 of separation arm 58 can be easily inserted between the optical disks, thus facilitating the optical disk separating operation.

When optical disk 150 is placed on a tray or the like in a separation state, first rib 103 and second rib 104 are brought into contact with a bottom surface of the tray. Accordingly, it is possible to prevent the occurrence of the case where the film forming region in which data is recorded is damaged due to a contact between the film forming region and the bottom surface of the tray or the occurrence of the case where a dust on the bottom surface of the tray adheres to a region where data is recorded and reproduced.

In optical disk 150, first clamp region 105 and second clamp region 106 and film forming regions 107, 108 are formed such that first clamp region 105 and second clamp region 106 do not overlap with film forming regions 107, 108 and hence, it is possible to prevent the rupture of film forming regions 107, 108 by projecting portions 111 of clamper 55.

In optical disk 150, first clamp region 105, second clamp region 106, first printing region 151 and second printing region 152 are formed such that first clamp region 105 does not overlap with first printing region 151 and second clamp region 106 does not overlap with second printing region 152 and hence, it is possible to prevent the rupture of first printing region 151 and second printing region 152 due to projecting portions 111 of damper 55 and the generation of dust due to clamping first printing region 151 and second printing region 152. Further, it is also possible to prevent a play which may be generated in optical disk 150 at the time of clamping due to a contact between projecting portions 111 of clamper 55 and uneven portions of the printing portions on first printing region 151 and second printing region 152.

Further, the printing portion is formed on first printing region 151 and second printing region 152 of optical disk 150 capable of recording information on both surfaces and hence, the front surface and the back surface of optical disk 150 can be easily distinguished from each other.

Other Embodiments

1

The thin wall portion formed at the center of the substrate in the optical disk according to the above-mentioned exemplified embodiments is not limited to the above-mentioned configuration. For example, even when the thin wall portion is configured as follows, the optical disk can acquire substantially the same advantageous effects as the above-mentioned exemplified embodiments.

As shown in FIG. 16 which is a cross-sectional view, in optical disk 200 capable of recording information on both surfaces, a thin wall portion 1411 may include: inclined surface 149 (one example of the inclined surface) which is inclined at a predetermined angle; and vertical surface 1413 (one example of non-inclined surface) which is continuously formed with an inner diameter side of inclined surface 149 and is formed along an outer diameter of through hole 140. In the same manner, thin wall portion 1412 may include: inclined surface 1410 (one example of the inclined surface) which is inclined at a predetermined angle; and vertical surface 1414 (one example of non-inclined surface) which is continuously formed with an inner diameter side of inclined surface 1410 and is formed along the outer diameter of through hole 140.

2

An optical disk capable of recording information on both surfaces may include the configuration for distinguishing front and back surfaces of the optical disk besides the above-mentioned exemplified embodiments. For example, it may be possible to record information for distinguishing a front surface and a back surface of the optical disk by partially changing shapes of groove-like tracks formed on a front-surface-side substrate and a back-surface-side substrate respectively or by forming uneven pits on the front surface and the back surface of the optical disk.

Figure 17A:
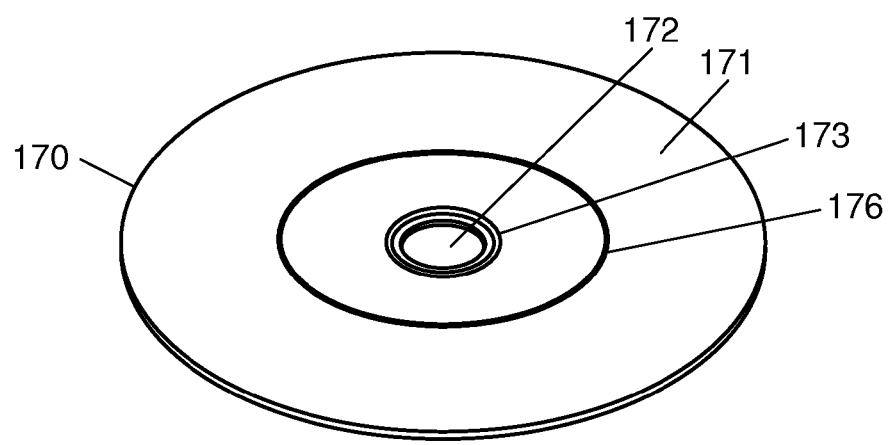
FIG. 17A is a perspective view of the optical disk according to another exemplary embodiment as viewed from a front surface of the optical disk.
Figure 17B:
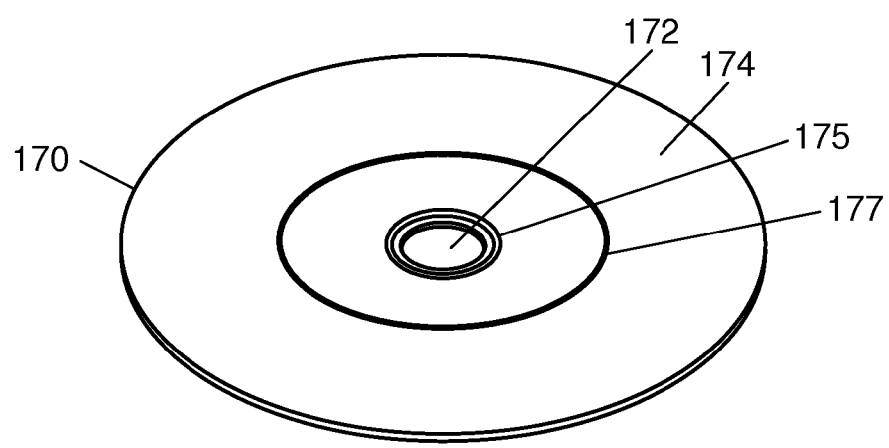
FIG. 17B is a perspective view of the optical disk according to another exemplary embodiment as viewed from a back surface of the optical disk.

FIG. 17A is a perspective view of optical disk 170 (one example of a disc-shaped information recording medium) as viewed from a front surface of optical disk 170. FIG. 17B is a perspective view of optical disk 170 as viewed from a back surface of optical disk 170. Optical disk 170 is configured by laminating substrate 171 having a predetermined thickness and substrate 174 having a predetermined thickness to each other. Optical disk 170 further includes: center cylindrical portion 173 on a front surface side in which through hole 172 is formed; and center cylindrical portion 175 on a back surface side in which through hole 172 is formed. Substrate 171 and substrate 174 are formed by injection molding using a transparent resin such as polycarbonate.

A recording film for recording information is formed on both substrate 171 and substrate 174, and substrate 171 and substrate 174 are laminated to each other such that surfaces on which the recording film is formed form outer sides. Numeral 176 indicates a groove-like track or an uneven pit formed in substrate 171, and information for distinguishing the front surface and the back surface is recorded by partially changing a shape of the track or a pattern of the uneven pit. In the same manner, numeral 177 indicates a groove-like track or an uneven pit formed in substrate 174, and information for distinguishing the front surface and the back surface is recorded by partially changing a shape of the track or by a pattern of the uneven pit.

Information in the optical disk includes two kind of information, that is, information dedicated to reproduction which is embedded in advance as described above, and information recorded later by applying a laser beam. In general, information dedicated to reproduction is reproduced prior to recorded information to be recorded. Accordingly, by recording information for distinguishing front and back surfaces of the substrate in advance as in the case of the present exemplified embodiments, when information is recorded on both surfaces and the surface on which information to be reproduced first is determined, for example, it is possible to readily recognize whether or not information on the correct surface is being reproduced.

3

Further, in the above-mentioned exemplified embodiments, optical disk capable of recording information on both surfaces is formed by laminating two substrates. However, the optical disk may include a single substrate where a recording film is formed on both surfaces, and thin wall portions may be formed symmetrically in a front-and-back direction. Further, by disposing first printing region 151 and second printing region 152 on an inner peripheral side, film forming region 107 and film forming region 108 can be also disposed on the inner peripheral side and hence, the recording regions can be widened.

4

In the above-mentioned exemplified embodiments, an optical disk is exemplified as an example of a disc-shaped information recording medium. However, the disc-shaped information recording medium is not limited to the optical disk. For example, the present invention is applicable to an opto-magnetic disk or other magnetic discs provided that the disk is a disc-shaped information recording medium.

5

The exemplified embodiments have been described heretofore as examples of the technique according to this disclosure. For this purpose, the attached drawings and the detailed description are provided.

Accordingly, the components described in the attached drawings and the detailed description may also include not only the components necessary for solving the problems but also components which are unnecessary for solving the problems in order to exemplify the aforementioned techniques. Therefore, such unnecessary components should not be immediately determined to be necessary, for the reason that these unnecessary components are described in the attached drawings and the detailed description.

Further, the aforementioned embodiment is merely for exemplifying the techniques according to this disclosure and, therefore, various changes, replacements, additions, omissions and the like can be made thereto within the scope of the claims and scopes equivalent thereto.

The exemplified embodiments of the present invention are applicable as a disc-shaped information recording medium or an information recording and reproducing apparatus for the disc-shaped information recording medium.

What is claimed is:

1. A information recording medium having a disk shape comprising:
    a substrate having a predetermined thickness;
    a first surface forming one surface of the substrate;
    a second surface forming the other surface of the substrate;
    a cylindrical portion in which a through hole penetrating a center of the substrate is formed;
    a first recording region formed on a first surface side;
    a second recording region formed on a second surface side;
    a first clamp region with which a clamper is brought into contact when the first recording region is reproduced, the first clamp region being formed on the first surface side;
    a second clamp region with which a clamper is brought into contact when the second recording region is reproduced, the second clamp region being formed on the second surface side;
    a first rib formed in a circular annular shape on the first surface side and on an inner peripheral side of the first clamp region;
    a second rib formed in a circular annular shape on a second surface side and on an inner peripheral side of the second clamp region; and
    a first printing region formed between the first rib and the first recording region.

2. The information recording medium according to claim 1, further comprising a thin wall portion configured to surround an outer diameter of the cylindrical portion, the thin wall portion having a thickness smaller than the predetermined thickness, wherein
    the thin wall portion includes: a non-inclined surface formed on the thin wall portion; and an inclined surface formed on an outer diameter side of the non-inclined surface at the thin wall portion and inclined at a predetermined angle with respect to the non-inclined surface.

3. The information recording medium according to claim 1, wherein the first printing region is formed on the first surface.

4. The information recording medium according to claim 1, wherein the first printing region is formed between the first surface and the second surface.

5. The information recording medium according to claim 1, wherein a second printing region is formed between the second rib and the second recording region.

6. The information recording medium according to claim 5, wherein the second printing region is formed on the second surface.

7. The information recording medium according to claim 5, wherein the second printing region is formed between the first surface and the second surface.

8. The information recording medium according to claim 1, further comprising a thin wall portion configured to surround an outer diameter of the cylindrical portion, the thin wall portion having a thickness smaller than the predetermined thickness, wherein
    the first surface side and the second surface side of the substrate are symmetrical to each other.

9. A disk cartridge comprising a case in which the information recording medium described in claim 1 is stored in an overlapping manner.

10. An information recording and reproducing apparatus comprising:
    the disk cartridge described in claim 9;
    a mechanism for taking out the information recording medium from the disk cartridge;
    a mechanism for recording information in the information recording medium taken out from the disk cartridge or for reproducing information from the information recording medium taken out from the disk cartridge; and
    an electric circuit for controlling recording of information in the information recording medium or reproduction of information from the information recording medium from the disk cartridge.

* * * * *